(12) United States Patent
Jensen et al.

(10) Patent No.: US 7,444,386 B2
(45) Date of Patent: Oct. 28, 2008

(54) APPLICATION PROGRAMMING INTERFACE FOR PROVISIONING SERVICES

(75) Inventors: Peter Strarup Jensen, Mountain View, CA (US); Pavel S. Veselov, San Jose, CA (US); Dianna L. Decristo, Venice, CA (US); Darryl J. Mocek, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 788 days.

(21) Appl. No.: 10/600,119

(22) Filed: Jun. 20, 2003

(65) Prior Publication Data

US 2004/0261086 A1 Dec. 23, 2004

(51) Int. Cl.
G06F 15/16 (2006.01)
G06F 3/00 (2006.01)
(52) U.S. Cl. .................. 709/217; 709/203; 709/317; 709/328
(58) Field of Classification Search ................ 709/203, 709/217; 719/317, 328
See application file for complete search history.

(56) References Cited

U.S. PATENT DOCUMENTS

| 2002/0066033 | A1* | 5/2002 | Dobbins et al. ............. 713/201 |
| 2002/0124082 | A1 | 9/2002 | San Andres et al. ......... 709/225 |
| 2003/0133554 | A1* | 7/2003 | Nykanen et al. ....... 379/201.01 |
| 2003/0217358 | A1* | 11/2003 | Thurston et al. ............ 717/174 |
| 2004/0003039 | A1* | 1/2004 | Humphrey et al. .......... 709/204 |

* cited by examiner

Primary Examiner—Jason Cardone
Assistant Examiner—Tanim Hossain
(74) Attorney, Agent, or Firm—Martine Penilla Gencarella, LLP (57) ABSTRACT

An invention is provided for provisioning services to client devices. In one embodiment, discovery transactions are included that allow an adapter software component to retrieve information regarding services available to a client device from a provisioning application. A service comprises a plurality of content files capable of being installed on the client device. Also included are subscription transactions that allow an adapter software component to manage content in service directories. A service directory comprises a plurality of services. In addition, delivery transactions are included that allow an adapter to facilitate downloading of data related to services to the client device.

9 Claims, 6 Drawing Sheets

APPLICATION PROGRAMMING INTERFACE FOR PROVISIONING SERVICES

CROSS REFERENCE TO RELATED APPLICATIONS

This application is related to U.S. patent application Ser. No. 10/600,281, filed Jun. 20, 2003, and entitled "Protocol Method for Provisioning Services," which is incorporated herein be reference.

BACKGROUND OF THE INVENTION

1. Field of the Invention

This invention relates generally to computer networking, and more particularly to an application programming interface for provisioning services using limited defined atomic units.

2. Description of the Related Art

Current mobile computing environments allow computer users great variety in digital services, which can vary from device to device depending on the type of client device used and the needs of the user. Typically, mobile client devices obtain digital services via a provisioning server as illustrated in FIG. 1.

Figure 1:
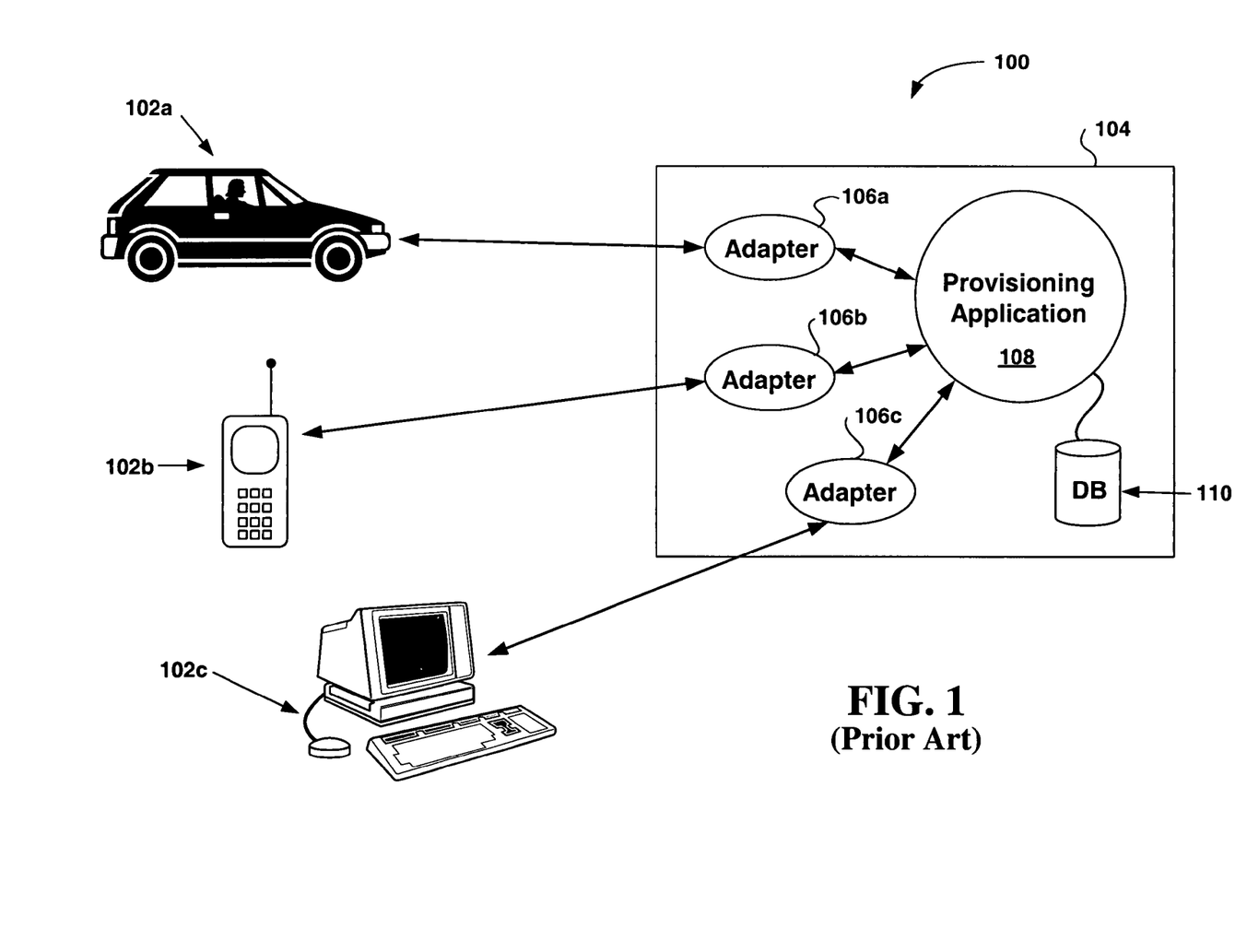
FIG. 1 is an illustration showing a prior art provisioning framework.

FIG. 1 is an illustration showing a prior art provisioning framework 100. The provisioning framework 100 includes a plurality of client devices 102a-102c in digital communication with a provisioning server 104. The client devices 102a-102c can be any type of digital computing device. For example, as shown in FIG. 1, exemplary client devices include telematics client devices 102a in automobiles, mobile phones 102b, and a desktop computers 102c.

The provisioning server 104 is a network resource from which the client devices 102a-102c can obtain access to new digital services and update existing digital services. As illustrated in FIG. 1, one approach to implementing the provisioning server 104 is an adapter/application model. In this approach, the provisioning server 104 includes a plurality of provisioning adapter modules 106a-106c, which facilitate communication between the client devices 102a-102c and a provisioning application 108. The provisioning application 108 generally is a generic and more device independent application that includes the business logic for the provisioning service.

Each provisioning adapter 106a-106c is designed to communicate with a specific type of client device, and "translate" the client device communication into a form understandable by the provisioning application 108. For example, provisioning adapter 106a can be designed to communicate with the telematics client device 102a. In this case, the provisioning adapter 106a receives commands from the telematics client device 102a and translates the received commands into commands acceptable by the provisioning application 108. Similarly, the provisioning adapter 106b receives and translates commands from the mobile phone client device 102b, and the provisioning adapter 106c receives and translates commands from the desktop computer client device 102c.

As can appreciated, each provisioning adapter 106a-106c also facilitates command and content delivery from the provisioning application 108 to each client device 102a-102c. That is, the provisioning adapter 106a receives commands from the provisioning application 108 and translates the received commands into commands acceptable by the telematics client device 102a. Similarly, the provisioning adapter 106b receives and translates commands from provisioning application 108 and delivers them to the mobile phone client device 102b, and the provisioning adapter 106c receives and translates commands for delivery to the desktop computer client device 102c.

Generally, the provision server 104 keeps track of users using a database 110, which stores user information, service content, and other data usable by the provisioning application 108. In this manner, different services can be provided to different users based on their user information. For example, a particular user can pay for a service and a record of payment can be stored in the user information for that particular user. Thereafter, the user can access the services and other content bought.

Unfortunately, prior art provisioning servers 104 do not have a standard mechanism for communication between the adapters 106a-106c and the provisioning applications. Hence, different provisioning applications 108 can require different interface programming. Moreover, each adapter 106a-106c can implement commands to the provisioning application 108 in different manners. Thus, a prior art provisioning application 108 executed on a prior art provisioning server 104 generally is designed to operate with specific provisioning adapters 106a-106c that are designed along with the provisioning application 108. As a result, new provisioning adapters generally cannot be added to the provisioning server 104 without altering the provisioning application 108. That is, the provisioning application 108 generally must be altered if a further provisioning adapter is added at a later date to facilitate communication with another client device. Although improved client provisioning mechanisms have been developed, the flexibility and scope of these improvements are very limited.

In view of the foregoing, there is a need for a method for provisioning services that provides a standard communication mechanism for provisioning applications and provisioning adapters. The method should provide provisioning services using limited defined atomic units that can be utilized for a wide variety of applications and client devices.

SUMMARY OF THE INVENTION

Broadly speaking, the present invention fills these needs by providing an application programming interface for provisioning services that provides a standard mechanism for communication between provisioning adapters and a more generic provisioning application. In one embodiment, the application programming interface (API) includes discovery transactions that allow an adapter software component to retrieve information regarding services available to a client device from a provisioning application. A service comprises a plurality of content files capable of being installed on the client device. The API also includes subscription transactions that allow an adapter software component to manage content in service directories. As will be described in greater detail below, a service directory comprises a plurality of services. In addition, delivery transactions are included in the API that allow an adapter to facilitate downloading of data related to services to the client device. In one aspect, the discovery transactions can include a service discovery transaction that allows an adapter to obtain information regarding a particular service, and a service directory discovery transaction that allows an adapter to obtain information regarding a particular service directory.

A method for provisioning services is disclosed in an additional embodiment of the present invention. The method includes providing discovery transactions that allow an adapter software component to retrieve information regarding services available to a client device from a provisioning application. Also, subscription transactions are afforded that allow an adapter software component to manage content in service directories, and delivery transactions are provided that allow an adapter to facilitate downloading of data related to services to the client device. In one aspect, the subscription transactions can include a service subscription transaction that allows a service to be added to a service directory, and an unsubscribe transaction that allows a service to be removed from a service directory.

In a further embodiment of the present invention, a system for provisioning services is disclosed. The system includes a provisioning server executing a provisioning application. In communication with the provisioning application is a provisioning API. As above, the provisioning API includes discovery transactions that allow an adapter software component to retrieve information regarding services available to a client device from a provisioning application. The provisioning API also includes subscription transactions that allow an adapter software component to manage content in service directories, and delivery transactions that allow an adapter to facilitate downloading of data related to services to the client device. Further included in the system is at least one adapter software component in communication with the provisioning application via the provisioning API. The adapter software component is also in communication with a client device. In one aspect, the delivery transactions of the provisioning API can include an update transaction that allows an adapter to obtain a provisioning update comprising a list of services that should be installed on the client device. The delivery transactions can further include a notification transaction that allows the provisioning application to request an adapter to perform an update transaction, and a delivery transaction that allows an adapter to obtain a link to data, the link facilitating downloading of the data. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a method for provisioning services. Generally, embodiments of the present invention provide an application programming interface for provisioning services that provides a standard mechanism for communication between provisioning adapters and a more generic provisioning application. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 2:
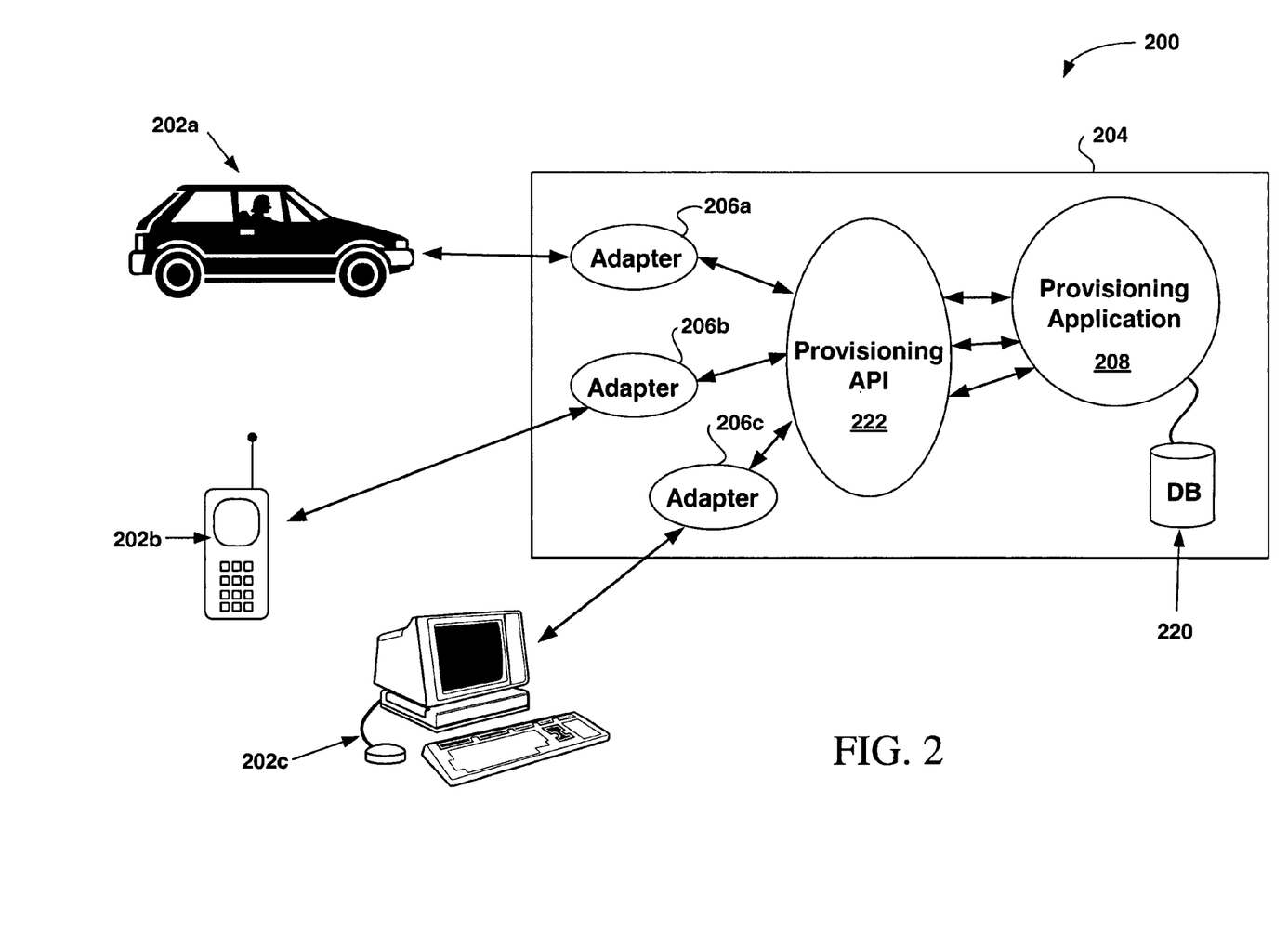
FIG. 2 is an illustration showing a provisioning system using a provisioning application programming interface (API), in accordance with an embodiment of the present invention.

FIG. 1 was described in terms of the prior art. FIG. 2 is an illustration showing a provisioning system 200 using a provisioning application programming interface (API), in accordance with an embodiment of the present invention. The provisioning system 200 includes a plurality of client devices 202a-202c in digital communication with a provisioning server 204. The client devices 202a-202c can be any type of digital computing device, such as telematics client devices 202a in automobiles, mobile phones 202b, a desktop computers 202c, or any other type of client device capable of communicating with the provisioning server 204. Each client device 202a-202c is capable of establishing a network connection, which can be a physical connection or 20 wireless connection, to the provisioning server 204. In addition, each client device 202a-202c may be intermittently ON or OFF, and intermittently connected to the network when the client device 202a-202c is ON.

Similar to above, the provisioning server 204 is a network resource from which the client devices 202a-202c can obtain access to new digital services and update existing digital services. The provisioning server 204 includes a plurality of provisioning adapters modules 206a-206c, which facilitate communication between the client devices 202a-202c and a provisioning application 208. As above, the provisioning application 208 is a generic and device independent application that includes the business logic for the provisioning system 200. In use, the provisioning application 208 receives and provides commands to the provisioning API 222, which facilitates communication with the provisioning adapters 206a-206c.

The provisioning server 204 is a highly available network resource that can be embodied on a single computer or on a plurality of computers. For example, to increase availability, scalability, and manageability, the provisioning server 204 can be embodied on a collection of tightly coupled computers. However, from the point of view of the client devices 202a-202c, the provisioning server 204 generally appears as a single logical entity.

As will be described in greater detail subsequently, the provisioning server 204 of the embodiments of the present invention provides discovery, subscription, and delivery functionality for the client devices 202a-202c. Broadly speaking, the provisioning server 204 provides discovery functionality allowing a user of a client device 202a-202c to discover services and contents that are available to the particular client device. Subscription functionality is provided by allowing a user of a client device 202a-202c to manage the content of services directories, described in greater detail below. The provisioning server's 204 delivery functionality allows a client device 202a-202c to receive content that has become available to the device or content that should be removed from the device. In addition, delivery functionality allows a client device 202a-202c to download available content.

Each provisioning adapter 206a-206c is designed to communicate with a specific client device, and "translate" or "map" the client device communication into a form specified by the provisioning API 222. For example, provisioning adapter 206a can be designed to communicate with the telematics client device 202a. In this case, the provisioning adapter 206a receives commands from the telematics client device 202a and translates the received commands into commands acceptable by the provisioning API 222. Similarly, the provisioning adapter 206b receives and translates commands from the mobile phone client device 202b, and the provisioning adapter 206c receives and translates commands from the desktop computer client device 202c.

As can appreciated, each provisioning adapter 206a-206c also facilitates command and content delivery from the provisioning API 222 to each client device 202a-202c. That is, the provisioning adapter 206a receives commands from the provisioning API 222 and translates the received commands into commands acceptable by the telematics client device 202a. Similarly, the provisioning adapter 206b receives and translates commands from provisioning API 222 and delivers them to the mobile phone client device 202b, and the provisioning adapter 206c receives and translates commands for delivery to the desktop computer client device 202c.

The provisioning API 222 defines several specific roles a provisioning adapter 206a-206c may play with respect to the provisioning application 208. More specifically, the provisioning API 222 defines a common set of abstractions for sharing information between the provisioning adapters 206a-206c and the provisioning application 208. In addition, the provisioning API 222 of the embodiments of the present invention defines a precise set of adapter/application interactions, which allow the mapping of a wide range of client specific provisioning models to a generic provisioning application 208.

In this manner, the provisioning API 222 supports provisioning models where the provisioning server 204 plays a central role in managing which services and content are accessible and delivered to each client device 202a-202c. This is important, for example, in fleet management. For example, a corporation may deploy a large population of client devices 202a-202c, but want to retain strict control over the software configuration of each client device 202a-202c. It should be noted that the method for provisioning services of the embodiments of the present invention can be implemented in a plurality of manners, of which the provisioning API 222 is one.

As mentioned above, the provisioning server 204 provides services and content to client devices 202a-202c. In the following description, a service is defined as a collection of one or more downloadable content files that are installed on a client device 202a-202c in order to provide the user of the client device with a particular functionality. Services can also be utilized to customize the user experience of existing functionality present on the client device. A content file can be an executable file, media files, property files, archive files, or any other file that may be required to provide a particular functionality on a client device. For example, exemplary content files can be executable Java byte code files, sound files, a Video files, and image files. Services provide a product-level view of content that is usable by client device users, while individual content files represent a resource-level view that may or may not be exposed to the client device user.

In addition to individual services, embodiments of the present invention also process service directories. A service directory is an identifiable collection of services. A service directory also can be associated with a collection of nested service directories. In use, service directories can be defined for a plurality of administrative purposes. For example, a service directory can be utilized for presentation and navigation of service categories, and tracking of subscriptions and service deployment. Generally, the provisioning application 208 manages the content of a service directory. For example, the provisioning application 208 can manipulate a service directory as a result of a dynamic calculation or using a database 220 representation.

A bundle is defined as a physical downloadable component. Bundles are parts of services, and are generally used during delivery. When a service is being delivered to a client device, all the required bundles corresponding to that service are downloaded to the client device. In one embodiment, a bundle includes two parts, a descriptor file and an actual content file. Generally these parts may be downloaded separately, however, the descriptive information for each bundle in a service can also be aggregated in the service description (service object). A bundle can also include a URL property, which is utilized for downloading.

In one embodiment, client objects can be utilized to store specific client device data during calls to the provisioning application 208. In this embodiment, when an adapter 206 calls the provisioning application 208, the adapter 206 provides a client device object along with the request. The client device object can be utilized to store information specific to that particular call, and will be returned "as is" to the adapter 206 in the reply to the call. In this manner, an adapter 206 can retrieve the stored information upon receiving the reply, which may be needed when the adapter instance that sent the request is not the same adapter instance that receives the reply from the provisioning application 208.

Figure 3:
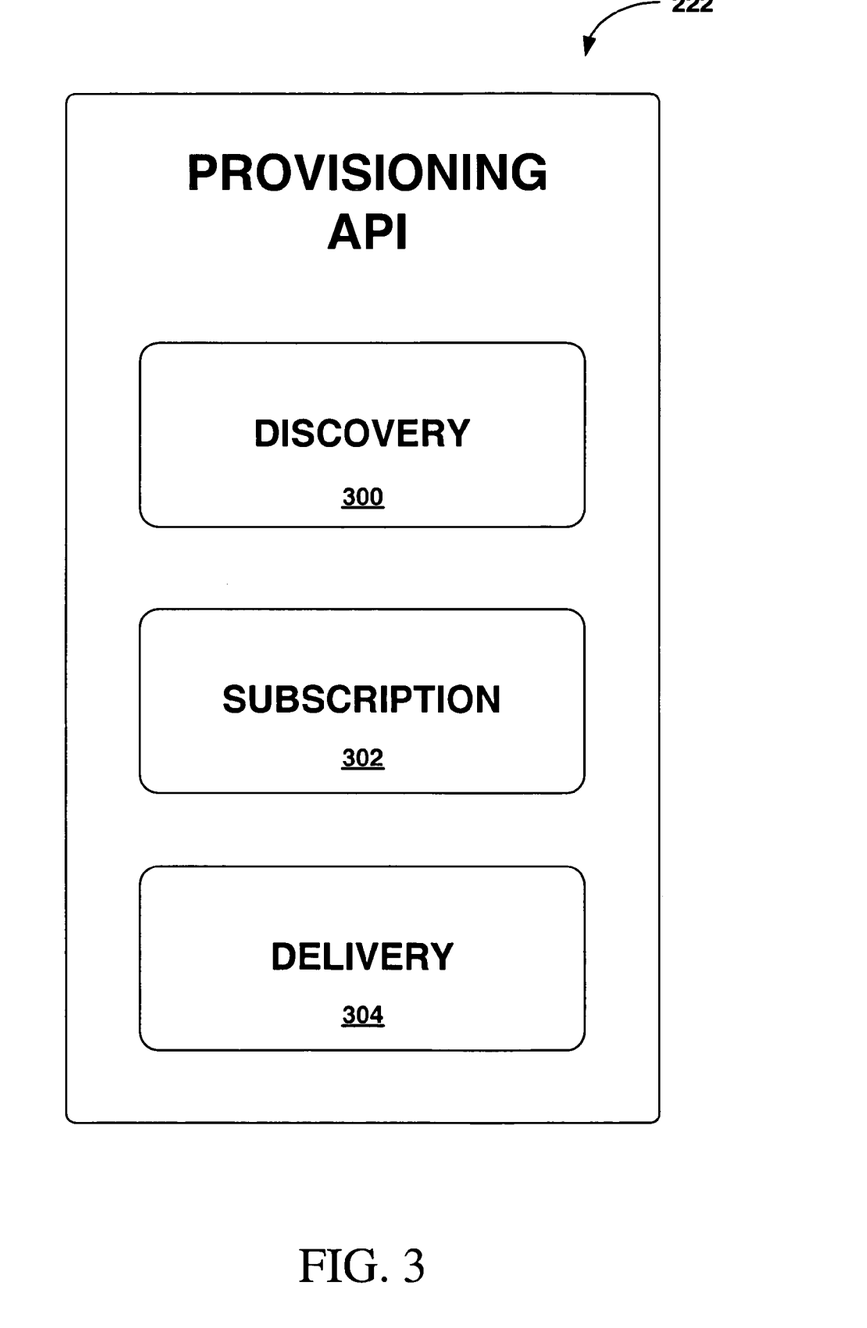
FIG. 3 is a block diagram illustrating the logical components of a provisioning API, in accordance with an embodiment of the present invention.

FIG. 3 is a block diagram illustrating the logical components of a provisioning API 222, in accordance with an embodiment of the present invention. As shown in FIG. 3, the provisioning API 222 provides discovery transactions 300, subscription transactions 302, and delivery transactions 304. The provisioning API 222 defines the interactions between the adapters and the provisioning application, as they relate to the main area of functionality defined for the provisioning server.

Thus, the provisioning API 222 defines three roles a provisioning adapter can play with respect to the provisioning application. Viewed from the provisioning application these are discovery, subscription, and delivery adapters. However, from the client perspective, a single adapter may play alternate roles, depending on the client specific provisioning model supported. Therefore, although a particular implementation of an embodiment of the present invention may define three different types of adapters, this is not a restriction imposed by the invention. Thus, embodiments of the present invention define a set of transactions for the interaction between the provisioning application and an adapter in each of the three roles.

The discovery transactions 300 are used by adapters to retrieve information about services available to particular client devices and users, based on available contextual information. It should be noted that discovery transactions 300 can be utilized to retrieve information regarding services available to client devices that are different from the client device used to perform discovery. Subscription transactions 302 are utilized to manage the content of service directories. The name subscription refers to the fact that within the confines of most provisioning models these transactions are most commonly used to manipulate the content of a service directory modeling the set of services that have been subscribed to a particular client device. Delivery transactions 304 are used to discover content files that need to be either installed or removed from a client device. In addition, delivery transactions 304 can also be used to obtain download identifiers for content files.

In one embodiment, the above transactions are initiated by an adapter and comprise one request and one reply. Typically, a transaction is committed by the adapter upon receipt of the reply and by the provisioning application upon sending the reply. Although, a general purpose provisioning application generally supports all of the transactions described, a special purpose provisioning service can also be utilized with the embodiments of the present invention. For example, a special purpose provisioning server, which is only required to support a limited set of client specific provisioning models, may only need to implement a subset of these transactions.

Figure 4:
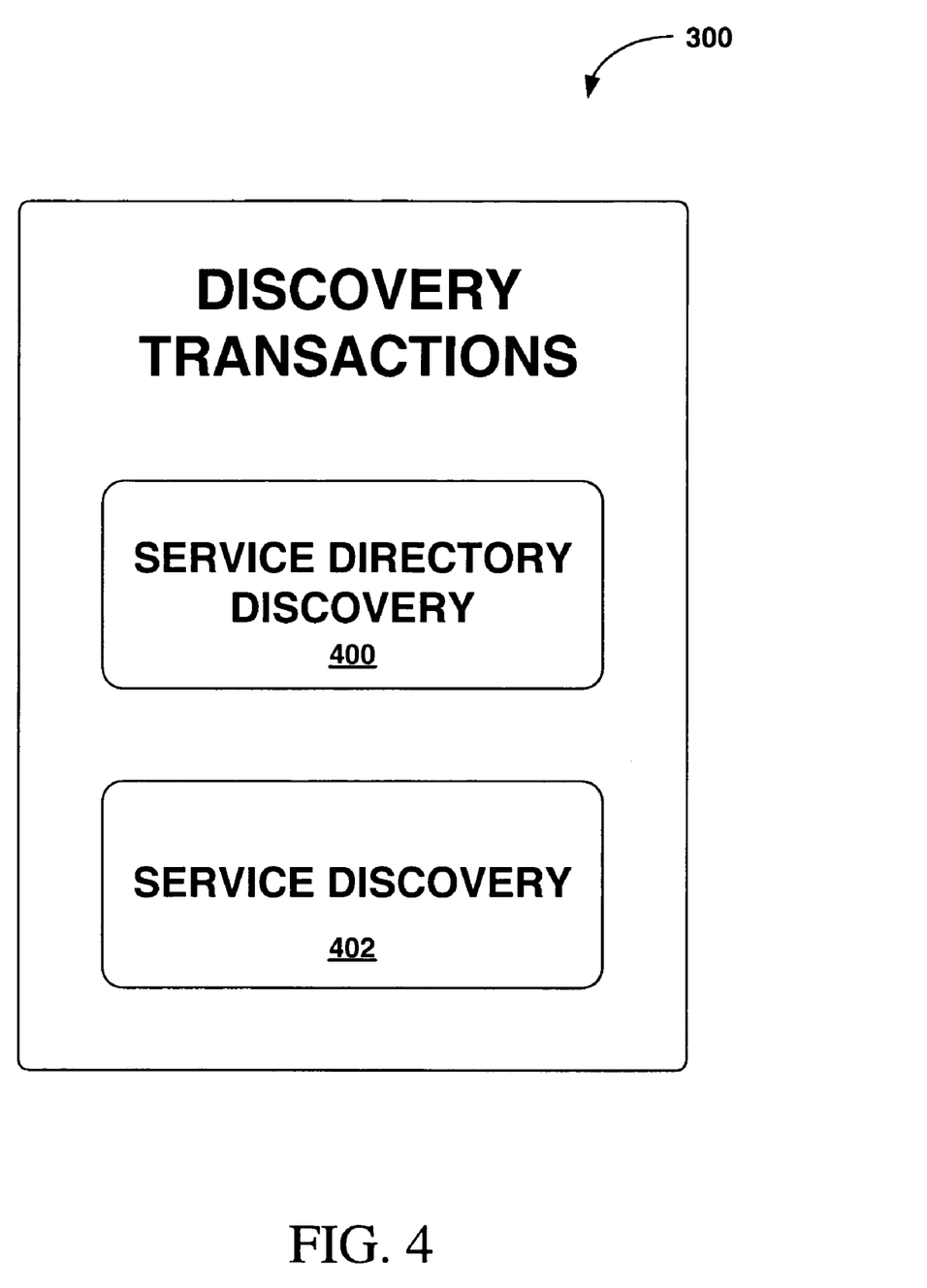
FIG. 4 is a block diagram showing exemplary discovery transactions, in accordance with an embodiment of the present invention.

FIG. 4 is a block diagram showing exemplary discovery transactions 300, in accordance with an embodiment of the present invention. The discovery transactions 300 on the application side provide capabilities to discover certain services or service directories. In one embodiment, the provisioning server includes client device information for each client device it services. The client device information for each client device can have three special service directories assigned to it, namely, an available services directory, a deployed services directory, and a subscribed services directory. The available services directory lists all the services currently available to the particular client device. The deployed services directory lists all the services that are currently deployed or delivered to the particular client device, and the subscribed services directory lists all the services currently subscribed to by the particular client device. To provide information on these services and service directories, embodiments of the present invention provide two discovery transactions, namely, a service directory discovery transaction 400 and a service discovery transaction 402.

The service directory discovery transaction 400 facilitates service directory discovery requests. In use, an adapter makes a call to the provisioning application via the provisioning API requesting information about a service directory matching particular search criteria. In reply, the provisioning application provides information about a matching service directory (or an error) to the requesting adapter, or another instance of the requesting adapter. In one embodiment, the provisioning API has a method that receives a client device object and a directory object, representing a desired service directory. The provisioning application can write appropriate directory information, such as a list of services and service directories contained in the requested service directory, and the adapter can query the directory object returned from the provisioning application to obtain the service directory information. Thereafter, the adaptor codes the service directory information into a client specific protocol and sends it to the client.

The service discovery transaction 402 facilitates service discovery requests. In use, an adapter makes a call to the provisioning application via the provisioning API requesting information about a service matching particular search criteria. In reply, the provisioning application provides information about a matching service (or an error) to the requesting adapter, or another instance of the requesting adapter. In one embodiment, the provisioning API has a method that receives a client device object and a service object, representing a desired service. The provisioning application can write appropriate service information, such as an extended list of service properties, and the adapter can query the service object returned from the provisioning application to obtain the service information. Thereafter, the adaptor codes the service information into a client specific protocol and sends it to the client.

Figure 5:
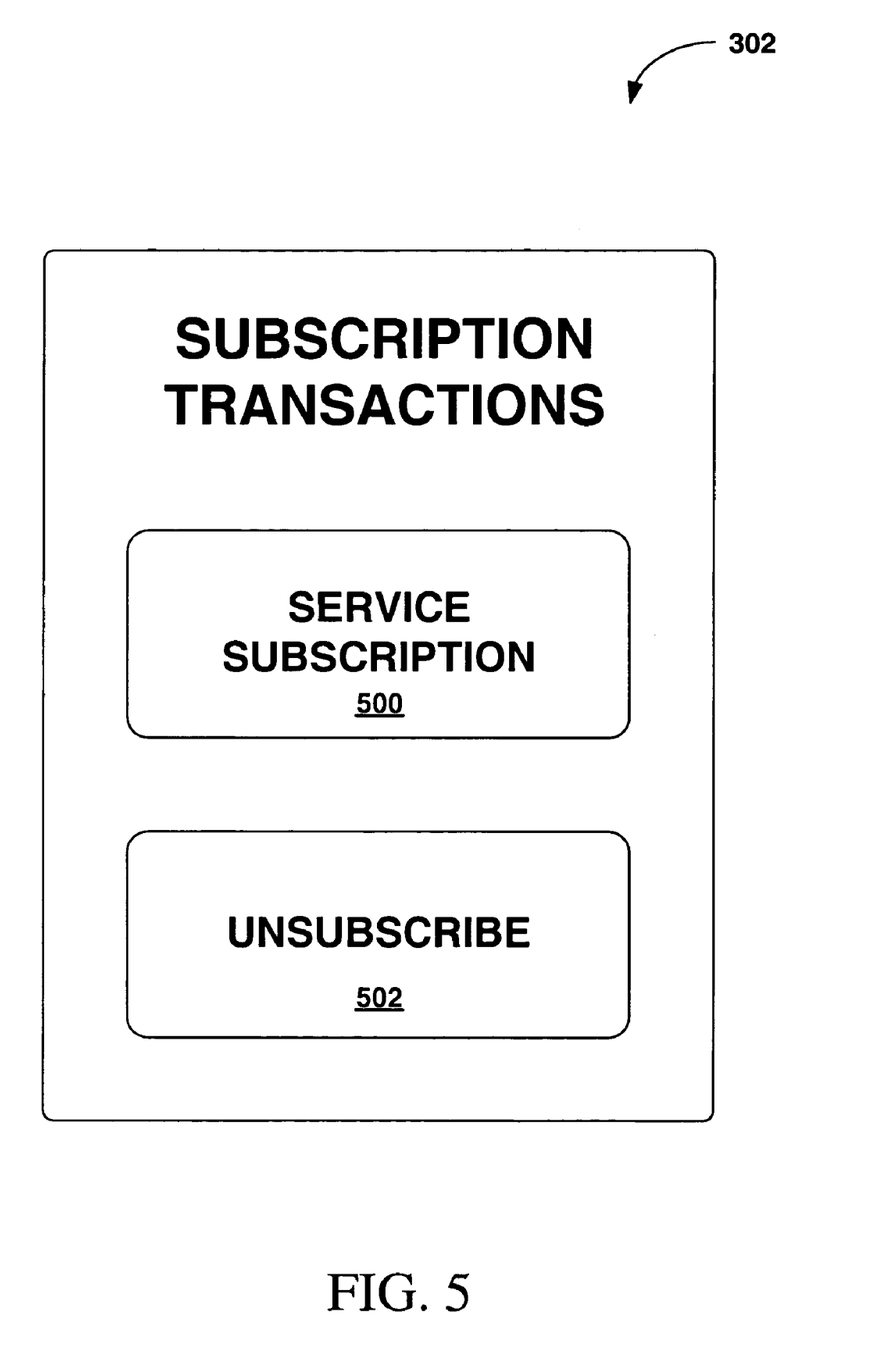
FIG. 5 is a block diagram showing exemplary subscription transactions, in accordance with an embodiment of the present invention.

FIG. 5 is a block diagram showing exemplary subscription transactions 302, in accordance with an embodiment of the present invention. The subscription transactions 302 on the application side provide the ability to subscribe or unsubscribe particular services to or from a client device. To provide information on this functionality, embodiments of the present invention provide two subscription transactions, namely, a service subscription transaction 500 and an unsubscribe transaction 502.

The service subscription transaction 500 facilitates service subscription requests. In use, an adapter makes a call to the provisioning application via the provisioning API requesting that one or more services be added to an identified service directory. In reply, the provisioning application adds the service or services to the identified service directory and returns a success or failure of the subscription operation to the requesting adapter, or other instance of the requesting adapter. In general, the request to subscribe includes a client device reference to the client device whose subscription will be modified, and a list of services that are to be added to the client device subscription.

The unsubscribe transaction 502 facilitates service unsubscribe requests. In use, an adapter makes a call to the provisioning application via the provisioning API requesting that one or more services be removed from an identified service directory. In reply, the provisioning application removes the service or services from the identified service directory and returns a success or failure of the unsubscribe operation to the requesting adapter, or other instance of the requesting adapter. In general, the request to unsubscribe includes a client device reference to the client device whose subscription will be modified, and a list of services that are to be removed from the client device subscription.

Upon execution of a subscription operation by the provisioning application, a reply is generated and is sent back to the client device. In one embodiment, the adapter includes a method that receives a client device object, a list of services objects, and an array of return values. Each return value should stand for corresponding service, so they align. Upon receiving the reply from the provisioning application, the adapter converts the reply to a client specific protocol, and sends the information to the client indicating which services were processed successfully or not, depending on the return code.

Figure 6:
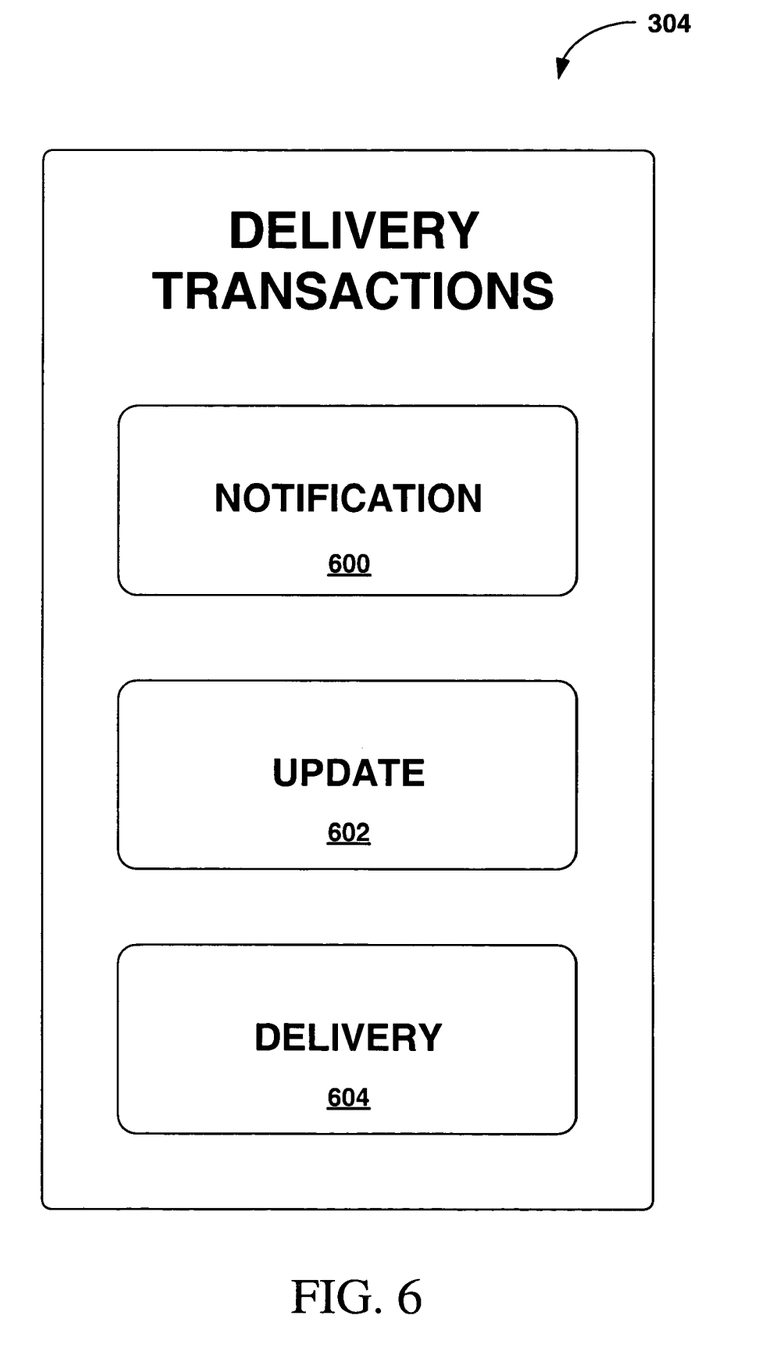
FIG. 6 is a block diagram showing exemplary delivery transactions, in accordance with an embodiment of the present invention.

FIG. 6 is a block diagram showing exemplary delivery transactions 304, in accordance with an embodiment of the present invention. The delivery transactions 304 are generally provide the capabilities of downloading bundles and calculating a provisioning update for a client device. As described in greater detail below, a provisioning update is a list of services that a client device should have installed. To provide information on this functionality, embodiments of the present invention provide three delivery transactions, namely, a notification transaction 600, an update transaction 602, and a delivery transaction 604.

The notification transaction 600 is utilized by the provisioning application to initiate a provisioning cycle. More particularly, the notification transaction 600 allows the provisioning application to send a notification to an adapter. The notification causes the adapter to execute an update transaction 602. In one embodiment, a notification method receives a client device object as an argument and causes the client device or adapter to query the provisioning server for an update. For example, in one embodiment, the adapter can forward the notification to the client device. Alternatively, the adapter can execute an update transaction 602 on behalf of the client device, and push content files to the client device as required.

The update transaction 602 is utilized to calculate the provisioning update for a client device. As mentioned above, a provisioning update is a list of services that a client device should have installed. It should be noted that the application view of that provisioning update list may be different from corresponding adapter's view of the provisioning update list, since the device client may have specific mechanisms for installing an application or keeping an application installed. For example, a particular client device may not have an ability to possess more than one application at a time in the client device's storage. The provisioning application calculates the provisioning update using the subscribed and deployed special service directories for the corresponding client device.

In one embodiment, a method for calculating an update has a list of service objects as a parameter. This service objects list may be specified by the adapter or client device for synchronization purposes. If the service objects list is present as an argument, the application will ignore it's own knowledge of currently deployed services, and will use the service objects list as a deployed list of services. In this manner, the service objects list can be passed to the provisioning application if the client device or adapter believes that the client device and provisioning database are out of synchronization.

On reply, the provisioning application calls a method on the adapter side to send the provisioning update back to the client device. The response can contain a client device id, status code, list of services that client device misses, and the list of services that client device should not have anymore. A status code shows whether the application believes that client is out of synchronization or not. The status code may also indicate an error condition. If the provisioning application has decided that client device and database are out of synchronization, the adapter can query the client device to send the list of deployed services. If this information is unavailable from either the client or adapter, the adapter can call the provisioning application specifying an empty set instead of the service objects list. In this case, the provisioning application will respond with the list of services that a client device should have.

The delivery transaction 604 is utilized to download bundles to the client device. In use, the adapter requests a particular bundle using a bundle identifier obtained using the update transaction 602. Optionally, the bundle identifier can be obtained using a discovery transaction, depending on the particular implementation. In reply, the provisioning application provides a URL from which the requested bundle can be downloaded using the adapter, or optionally, the client device.

In one embodiment, a method is included in the delivery transaction 604 that the provisioning application can call in reply to receiving a deliver request. This method provides the bundle URL to the adapter and passes the client device object along. In this manner, the adapter will be aware of where to download the bundle. This method also includes a status code, which can be implementation specific, that indicates whether or not the URL is valid. Although the status code is implementation specific, one embodiment utilizes HTTP response codes. Upon receiving a status code that shows that the URL download has failed, adapter can notify the client about the failure instead of uploading the data.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for provisioning services, comprising the operations of:
   providing discovery transactions that allow an adapter software component to retrieve information regarding services available to a client device from a provisioning application, wherein the provisioning application includes client device information for each client device the provisioning application services, wherein each of said services comprises a plurality of content files capable of being installed on the client device;
   affording subscription transactions that allow said adapter software component to manage content in service directories, wherein one said service directories comprises a plurality of said services; and
   providing delivery transactions that allow said adapter to facilitate downloading of data related to said services to the client device, with the delivery transactions including an update transaction that allows said adapter to obtain a provisioning update comprising a list of said services that should be installed on the client device, and a notification transaction that allows the provisioning application to request said adapter to perform said update transaction.

2. The method as recited in claim 1 wherein the discovery transactions includes a service discovery transaction that allows said adapter to obtain information regarding a desired service.

3. The method as recited in claim 2 wherein the discovery transactions include a service directory discovery transaction that allows said adapter to obtain information regarding a desired service directory.

4. The method as recited in claim 1 wherein the subscription transactions include a service subscription transaction that allows a desired service to be added to a desired service directory.

5. The method as recited in claim 4 wherein the subscription transactions include an unsubscribe transaction that allows said desired service to be removed from said desired service directory.

6. The method as recited in claim 1, wherein the delivery transactions include a delivery transaction that allows said adapter to obtain a link to data, the link facilitating downloading of the data.

7. A system for provisioning services, comprising:
   a provisioning server executing a provisioning application;
   an adapter software component embodied within the provisioning server; and
   a provisioning application programming interface (API), embodied within the provisioning server, in communication with the provisioning application and said adapter software component, the provisioning API comprising:
   discovery transactions that allow said adapter software component to retrieve information regarding services available to a client device from a provisioning application, wherein the provisioning application includes client device information for each client device the provisioning application services, wherein a service comprises a plurality of content files capable of being installed on the client device;

subscription transactions that allow an adapter software component to manage content in service directories, wherein a service directory comprises a plurality of services; and delivery transactions that allow an adapter to facilitate downloading of data related to services to the client device, with the delivery transactions including an update transaction that allows said adapter to obtain a provisioning update comprising a list of services that should be installed on the client device, the delivery transactions further including a notification transaction that allows the provisioning application to request an adapter to perform an update transaction, and wherein the delivery transactions further include a delivery transaction that allows said adapter to obtain a link to data, the link facilitating downloading of the data.

8. The system as recited in claim 7 wherein the discovery transactions allows an adapter to obtain information regarding a desired service, and wherein the discovery transactions further include a service directory discovery transaction that allows said adapter to obtain information regarding a desired service directory.

9. The system as recited in claim 7 wherein the subscription transactions allows a desired service to be added to a desired service directory, and wherein the subscription transactions further include an unsubscribe transaction that allows said desired service to be removed from said desired service directory.

* * * * *